(12) United States Patent
Michaelis et al.

(10) Patent No.: US 10,634,550 B2
(45) Date of Patent: Apr. 28, 2020

(54) SYSTEMS AND METHODS FOR IDENTIFYING CHARACTERISTICS OF AN ENVIRONMENT OF AN ANTENNA USING VIBRATION DETECTION

(71) Applicant: CommScope Technologies LLC, Hickory, NC (US)

(72) Inventors: Scott L. Michaelis, Plano, TX (US); Sammit A. Patel, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 192 days.

(21) Appl. No.: 15/767,529

(22) PCT Filed: Sep. 28, 2016

(86) PCT No.: PCT/US2016/054085
§ 371 (c)(1),
(2) Date: Apr. 11, 2018

(87) PCT Pub. No.: WO2017/065972
PCT Pub. Date: Apr. 20, 2017

(65) Prior Publication Data
US 2018/0299321 A1 Oct. 18, 2018

Related U.S. Application Data

(60) Provisional application No. 62/241,328, filed on Oct. 14, 2015.

(51) Int. Cl.
*G01H 1/00* (2006.01)
*G01B 17/00* (2006.01)
*H01Q 1/00* (2006.01)
*H01Q 1/12* (2006.01)
*G01P 5/00* (2006.01)
*H01Q 1/24* (2006.01)

(52) U.S. Cl.
CPC ............... *G01H 1/00* (2013.01); *G01B 17/00* (2013.01); *G01P 5/00* (2013.01); *H01Q 1/125* (2013.01); *H01Q 1/246* (2013.01)

(58) Field of Classification Search
CPC ..................................................... H01Q 1/125
See application file for complete search history.

(56) References Cited

U.S. PATENT DOCUMENTS

| 5,610,339 A | 3/1997 | Haseley et al. |
|---|---|---|
| 6,876,099 B2 | 4/2005 | Wobben |
| 8,766,873 B2 | 7/2014 | Dalmazzo |
| 2007/0194982 A1 | 8/2007 | Stove |
| 2013/0147683 A1 | 6/2013 | Dalmazzo |
| 2013/0321225 A1* | 12/2013 | Pettus ...................... H01Q 3/08 343/765 |

(Continued)

OTHER PUBLICATIONS

Notification Concerning Transmittal of International Preliminary Report on Patentability, International Application No. PCT/US2016/054085, dated Apr. 26, 2018, 6 pp.

(Continued)

*Primary Examiner* — Herbert K Roberts
(74) *Attorney, Agent, or Firm* — Myers Bigel, P.A.

(57) ABSTRACT

Aspects of the present disclosure are directed to systems and methods for identifying characteristics of an antenna through detection of vibrational movement of the antenna.

13 Claims, 5 Drawing Sheets

(56) References Cited

U.S. PATENT DOCUMENTS

2014/0128748 A1    5/2014  Horng et al.
2017/0311307 A1*  10/2017  Negus .................. H04W 52/42

OTHER PUBLICATIONS

International Search Report and Written Opinion of the International Searching Authority, International Application No. PCT/US2016/054085, dated Dec. 1, 2016, 8 pages.

Sunsight Alignment Solutions, "Antenna Alignment Tools", downloaded Mar. 27, 2018 from https://www.sunsight.com/products/antenna-alignment-tools/, 4 pp.

Sunsight Alignment Solutions, "IoT Antenna Alignment Sensor", downloaded Mar. 27, 2018 from https://www.sunsight.com/products/antenna-alignment-sensor/, 4 pp.

Sunsight Alignment Solutions, "Antenna Misalignment—A Losing Proposition for Operators in More Ways than One", posted May 28, 2015, downloaded Mar. 27, 2018 from https://www.sunsight.com/news/2015/05/28/antenna-misalignment-a-losing-proposition-for-operators-in-more-ways-than-one/, 5 pp.

3Z Telecom, "3Z Antenna WASP—3Z Telecom Antenna Alignment Reinvented" downloaded Mar. 27, 2018 from https://3ztelecom.com/antenna-monitoring-sensor/, 5 pp.

* cited by examiner

SYSTEMS AND METHODS FOR IDENTIFYING CHARACTERISTICS OF AN ENVIRONMENT OF AN ANTENNA USING VIBRATION DETECTION

CROSS-REFERENCE TO RELATED APPLICATIONS

This application is a 35 U.S.C. § 371 national stage application of PCT Application Serial No. PCT/US2016/054085, filed on Sep. 28, 2016, which itself claims priority under 35 U.S.C. § 119 to U.S. Provisional Patent Application Ser. No. 62/241,328, filed Oct. 14, 2015, the entire content of both of which are incorporated herein by reference. The above-referenced PCT Application was published in the English language as International Publication No. WO 2017/065972 A1 on Apr. 20, 2017.

BACKGROUND

Cellular mobile operators are using more frequency bands, and increasingly more spectrum within each frequency band, to accommodate increased subscriber traffic and to deploy new radio access technologies. Based on network coverage requirements, to provide the required radio signal throughout a defined area, operators may need to configure a base station antenna to face a specific direction relative to true north ("azimuth angle"), to be inclined at a specific downward angle with respect to the horizontal in the plane of the azimuth ("elevation angle"), and to be vertically aligned with respect to the horizontal ("skew angle"). Together the azimuth, elevation and skew angles determine a "pointing direction" for the antenna. An antenna's azimuth, elevation and/or skew angles may change over time because of factors including, but not limited to, weather conditions, corrosion, poor initial installation, vibration, earthquakes, thermal effects, and the like. Undesired changes in any of these three angles may negatively affect the coverage of the antenna. For example, an error in the azimuth angle or the elevation angle of an antenna by as little as a few degrees can send radiated energy into a neighboring sector, decrease the level of service that an operator is able to provide, and/or may leave a gap in antenna coverage.

In an effort to monitor and potentially remedy such undesirable changes in the pointing direction of an antenna, antennas may include a monitoring system that has one or more sensors that monitor antenna parameters such as the above discussed azimuth, tilt and/or skew angles.

SUMMARY

Various aspects of the present disclosure may be directed to systems and methods for identifying characteristics of an environment of an antenna through detection of vibrational movement of the antenna. In one aspect, the method may include receiving vibration information associated with the antenna, and identifying a characteristic associated with the environment of the antenna based on the received vibration information.

BRIEF DESCRIPTION OF THE DRAWINGS

The following detailed description will be better understood when read in conjunction with the appended drawings. Example embodiments are illustrated in the drawings. It should be understood, however, that the disclosure is not limited to the pictured embodiments.

DETAILED DESCRIPTION

An antenna may include a monitoring system that has one or more sensors that monitor various parameters. Such antenna monitoring systems may be used, for example, to monitor the azimuth, tilt and/or skew angles of an antenna. An example of such a monitoring system is described in U.S. Pat. No. 8,766,873, the contents of which are incorporated herein in their entirety. Aspects of the present disclosure are directed to systems and methods for identifying characteristics of an environment of an antenna through detection of the above discussed parameters as well as monitoring of vibrational movement of the antenna.

Figure 1:
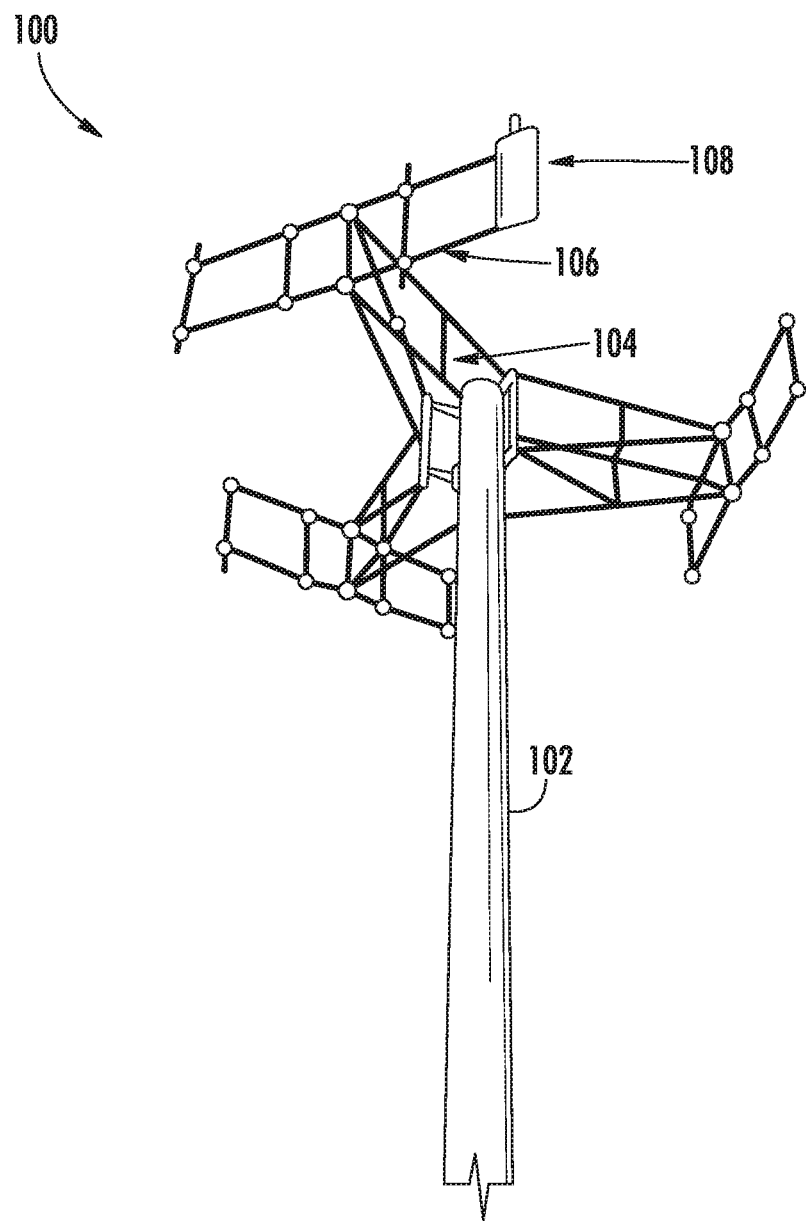
FIG. 1 is a perspective view of an example base station antenna structure.

FIG. 1 is a perspective view of a base station antenna structure 100. The base station antenna structure 100 may include a main mast 102 extending from the ground to a desired elevation. One or more horizontal support members 104 may be mounted to, and extend horizontally from, the main mast 102. The base station antenna structure 100 may also include one or more panel support members 106 that are attached to one or more of the horizontal support members 104. One or more base station antennas 108 may be secured to the panel support members 106. The base station antenna structure 100 may include other structural components as well, and/or may include more or fewer structural components, or may arrange the structural components in other configurations than shown in FIG. 1. It will also be appreciated that while FIG. 1 illustrates one example base station antenna structure, the methods disclosed herein may be used on a wide variety of different base station antenna structures.

Figure 2:
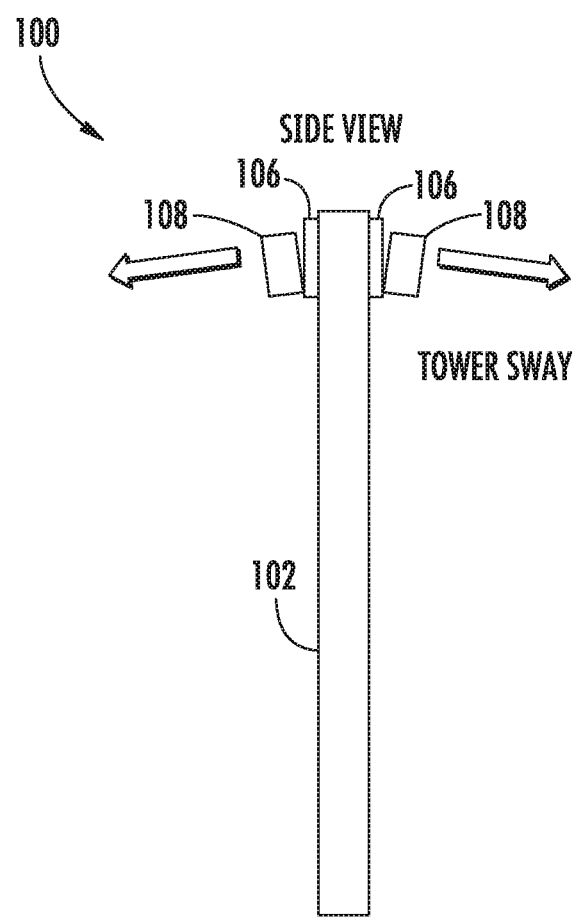
FIG. 2 is a schematic side view of the base station antenna structure of FIG. 1.
Figure 3:
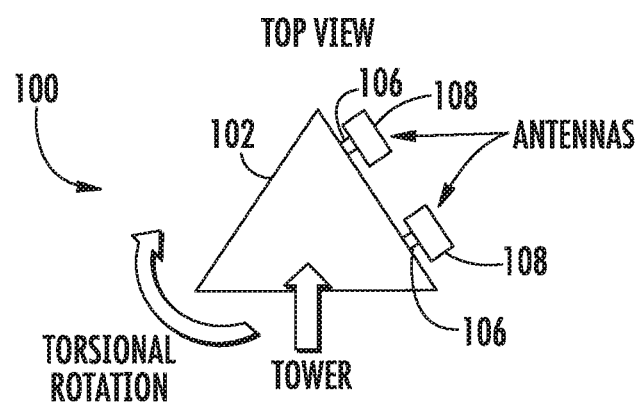
FIG. 3 is a schematic top view of the base station antenna structure of FIG. 1.

Any of the above discussed structural components of the base station antenna structure may exhibit vibrational movement in any direction and having any behavior. For example, one or more of the panel support members 106, or one or more of the horizontal support members 104 may sway front to back, left to right, or any combination thereof. Such movement of these structural components may in turn cause vibrational movement of one of more of the base station antennas 108. As shown in the side and top views of FIGS. 2 and 3, the entire base station antenna structure 100 may sway front to back, left to right, or any combination thereof. Moreover, the vibrational movement of one or more of the structural components or the entire base station antenna structure 100 may be torsional. For example, as shown in FIG. 3, the base station antenna structure 100 may periodically twist.

Figure 4:
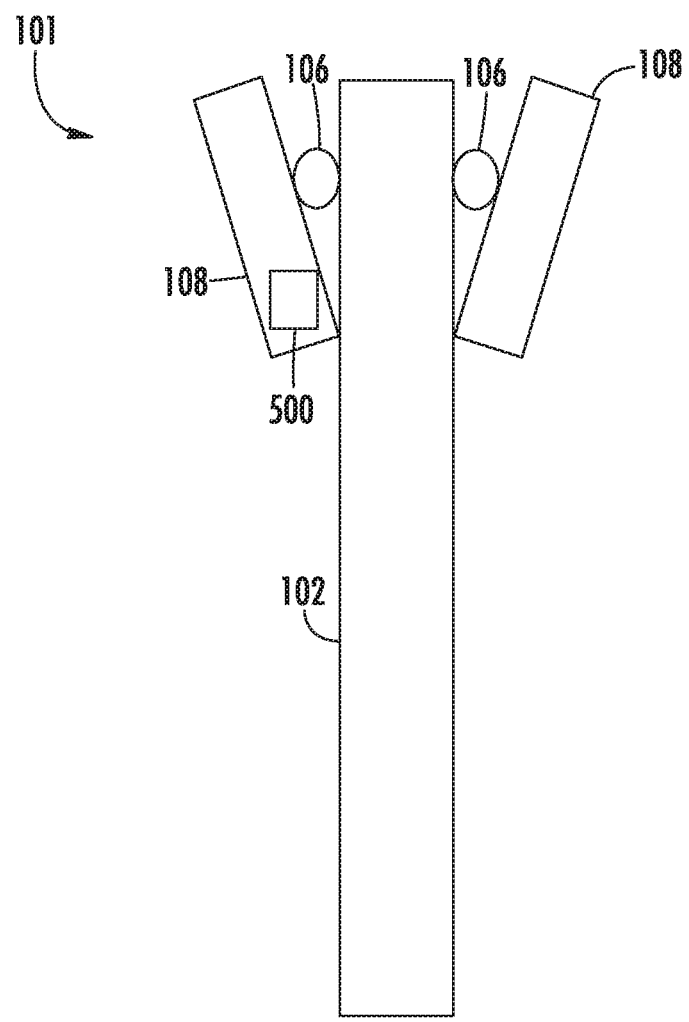
FIG. 4 is a schematic side view of a base station antenna structure illustrating placement of a vibration detection system according to embodiments of the present disclosure thereon.

FIG. 4 is a schematic side view of an example base station antenna structure 101 according to an aspect of the present disclosure. As shown in FIG. 4, the base station antenna structure 101 may include the main mast 102, panel support members (such as, for example, the panel support members 106 described above) connected thereto, and base station antennas 108 mounted to respective panel support members 106. Although not shown, as discussed above, the base station structure 101 may include horizontal support members 104 as well. Sensors 110, 112 (shown in FIG. 5) may be secured directly to one or more of the base station antennas 108. As described above, such sensors 110, 112 may take the form of the sensors described in U.S. Pat. No. 8,766,873. For each base station antenna 108, one sensor 110 may serve as an accelerometer to measure antenna movement in two directions, as along two perpendicular axes, such as changes in elevation and skew angles, and a second sensor 112 may serve as a gyroscope to measure angular movement, such as variations in azimuth angle. Either or both of the sensors 110, 112 may also be configured to detect vibrational movement of each of the base station antennas 108, all of which may be components of a vibration detection system 500 according to embodiments of the present disclosure. The vibration detection system 500 may be secured to any portion of each of the base station antennas 108 or to one or more of the structural components 102, 104, 106. Even though, as shown, the vibration detection system 500 is attached to, and used in conjunction with the base station antenna 108, it is noted that, according to aspects of the disclosure, systems and techniques may also be used communicably coupled to, and used in conjunction with backhaul antennas (e.g., parabolic reflector antennas used for microwave backhaul links). Moreover, the techniques described hereinthroughout may be applied to any type of antenna that is installed on a tower or other support structure incorporating pointing techniques (e.g., microwave, satellite, and the like).

Figure 5:
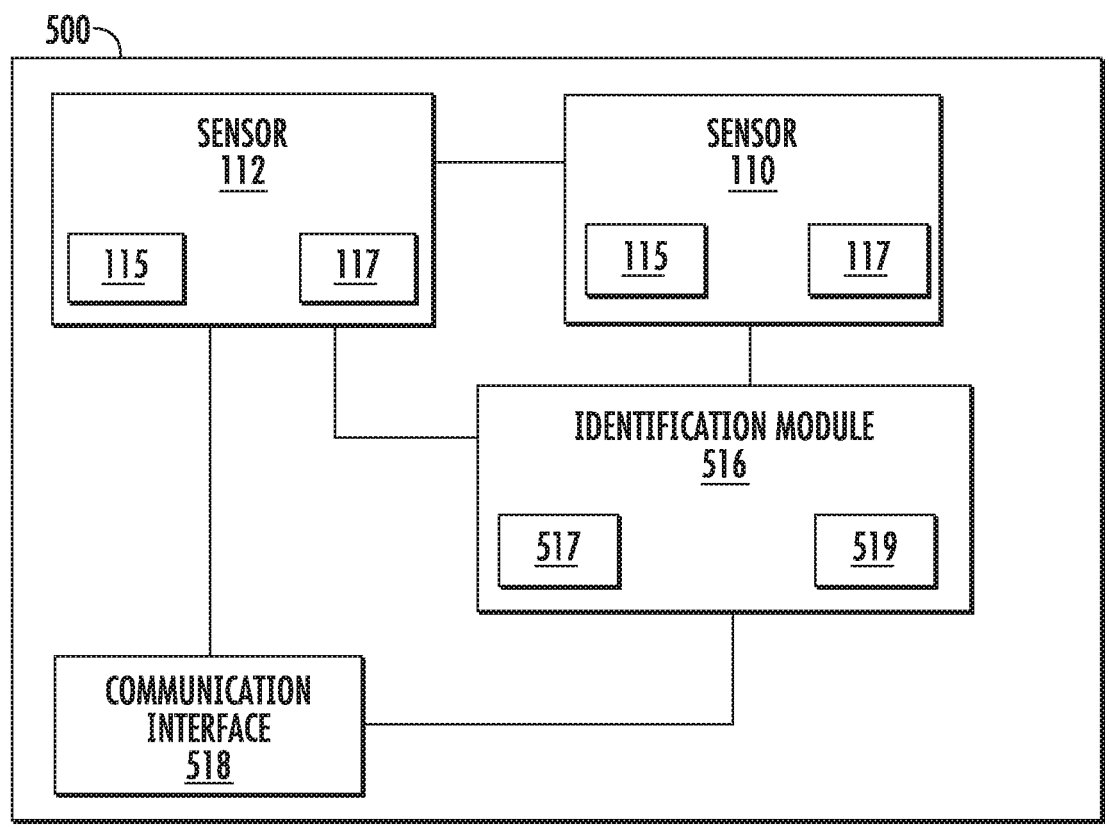
FIG. 5 is a block diagram illustrating components of a vibration detection system according to embodiments of the present disclosure.

FIG. 5 is a block diagram of various components of the vibration detection system 500 incorporating the above discussed sensors 110, 112. The system 500 may include one or more sensors 110, 112, an identification module 516, and a communication interface 518. It should be appreciated by those of ordinary skill in the art that the various components and the functions presented in FIG. 5, which will hereinafter be described in greater detail, are merely one illustration of an embodiment of the present disclosure. Thus, it should be clearly understood that other components may be substituted for any of the components shown in FIG. 5, and that components which perform other functions may alternatively be employed. In other words, aspects of the present disclosure are not limited to the precise structure and operation of the electrical/electronic and related components shown in FIG. 5.

The sensors 110, 112 may operate as described above to detect vibrational movement, and as described in U.S. Pat. No. 8,766,873 to detect azimuth, skew, and tilt, for example. One or both of the sensors 110, 112 may include a sensor processor 115 and one or more accelerometers 117 configured to detect one or more vibration samples of the base station antenna 108. It should be noted that the sensors 110, 112 (or one or more components thereof) may take the form of an accelerometer or other sensor capable of detecting vibrational movement. For example, either or both of the sensors 110, 112 may take the form of 9-axis MEMs device, MPU-9150 or other sensor device offered by Invensense Inc. of Sunnyvale, Calif.

The identification module 516 may be communicably coupled to the sensors 110, 112 and a communication interface 518. The identification module 516 may include an identification processor 517 and a memory 519. The memory 519 may be configured to store vibration information, including but not limited to vibration samples associated with particular operating characteristics of the antenna 108, such as, for example, reference vibration samples associated with typical operating states of antenna 108, vibration samples associated with particular weather patterns, wind speeds, thermal effects, and the like. The memory 519 may also store a history of vibrations of the base station antenna 108. The memory 519 may be realized as RAM memory, flash memory, EPROM memory, EEPROM memory, registers, a hard disk, a removable disk, or any other form of storage medium known in the art. The memory 519 may also store executable code configured to cause the identification processor 517 to implement operations to identify one or more characteristics of the base station antenna 108 or the environment of the base station antenna 108.

The identification module 516 may use a reference vibration sample from the memory 519 as well as a currently sensed vibration sample that is generated by the base station antenna 108. With such vibration information, the identification module 516 may perform an analysis of the amplitude of the vibration, particular frequencies, or both, of the reference vibration samples as well as currently sensed vibration samples. The analysis may ultimately use any combination of characteristics (in the time and/or frequency domains) to determine one or more characteristics of the base station antenna 108 or its environment. For example, the identification module 516 may compare one or more currently sensed vibration samples to one or more stored reference vibration samples. If the currently sensed vibration sample substantially matches a particular stored reference vibration sample, the identification module 516 may ascertain that the base station antenna 108, or its environment, has the specific characteristic associated with the reference vibration sample. It should be noted that the identification module 516 and/or one or more aspects of its functionality may be located remote from other components of the vibration detection system 500. For example, analysis of the amplitude, frequency, or any other feature of the vibration sample, may be performed remotely from the base station antenna 108. Raw vibration, azimuth, tilt, and or skew data sensed by the one or more sensors 110, 112, may be sent to the identification module 516 (remote to the base station antenna) 108 or other entity for processing and/or storage, for example.

Using other sensed information (e.g., azimuth, tilt, skew, and the like) along with sensed vibration information may allow the vibration detection system 500 to accurately ascertain a direction of the sensed vibration. For example, it may be known, and stored in the memory 519, that a particular vibration in a particular direction (e.g., vertically from the ground), and/or individual characteristics thereof, may be associated with seismic activity of an earthquake. The identification module 516 may compare currently received vibration samples, and directions of the same to an already identified reference vibration sample associated with an earthquake, which, as stored in memory, may exhibit certain vibrations, and in a vertical direction with respect to the ground. If the currently received vibration information is substantially similar to, (or exceeds certain characteristics of the reference vibration sample, such as amplitude), the identification module 516 may ascertain that the environment of the base station antenna 108 is experiencing an earthquake.

Using the above techniques, the system 500 may also determine whether a base station antenna 108 has been correctly installed. For example, it is known that a base station antenna 108 may sway with a relatively slow period in the wind. Too high of a sway frequency may indicate a poor installation of a bracket or other component. Through analysis of the sensed vibration in conjunction with information received from the other sensors 110, 112, the system 500 may determine if the base station antenna 108 needs to be repaired or reinstalled. For example, the identification module 516 may use one of more characteristics of a reference vibration sample as a baseline or threshold. For example, the identification module 516 may receive direction/vibration information from sensors 110, 112 and if the frequency in a particular direction of the sensed vibration is above a particular threshold frequency of the stored reference sample, the identification module 516 may determine that the base station antenna 108 is not installed properly.

The sensed vibrational movement may also be used to calculate wind speed in some embodiments. For example, the identification module 516 may have wind speeds and wind directions associated with reference vibration samples. If a sensed vibrational movement is substantially the same as such a stored reference vibration sample, then wind speed and/or wind direction may be determined based on the correspondence of the sensed vibrational movement to a reference vibration sample.

The above discussed techniques may be used to identify other characteristics, such as the height of a base station antenna 108 above the ground, wind speed of the environment, sun warming, thermal effects, and the like. Historical vibration samples of the base station antenna 108 may be used to determine a cause of any change in a pointing direction of the base station antenna (e.g., wind, bump, etc.). Also, vibration information combined with other movement information (e.g., from other sensors) may be used to determine when the base station antenna 108 is being serviced. In such a case, an alarm may be suspended, and/or historical vibration data could be removed.

The communication interface 518 may include a transceiver (not shown) configured to use any wired or wireless communication scheme known in the art for transmission of data, identification information, alarm notifications, and the like, to, for example, other parts of the base station antenna 108 or the base station antenna structure 100, an operator, or another entity local or remote to the base station antenna 108 for communication of any characteristics discussed herein. For example, as discussed above, raw vibration, azimuth, tilt, and or skew data sensed by the one or more sensors 110, 112 may be transmitted to the identification module 516, or other entity for processing and/or storage, either or both of which may be local or remote to the base station antenna 108.

As described herein, aspects of the present disclosure may be applied to many different applications and characteristics including but not limited to weather, earthquakes, wind speed, thermal effects, antenna operational status, and the like. These various applications and characteristics may be identified and incorporated in a single location (e.g., the vibration detection system 500) on a tower or other support structure of an antenna. Allowing for various applications to be incorporated into a single location may increase efficiency, and result in a cost savings in execution. Moreover, it should be noted that aspects of the present disclosure are not limited to implementation on base station antenna tower structures. For example, the vibration detection system 500 may be employed on any structure, such as but not limited to buildings, street light support structures, traffic light support structures, and the like.

Figure 6:
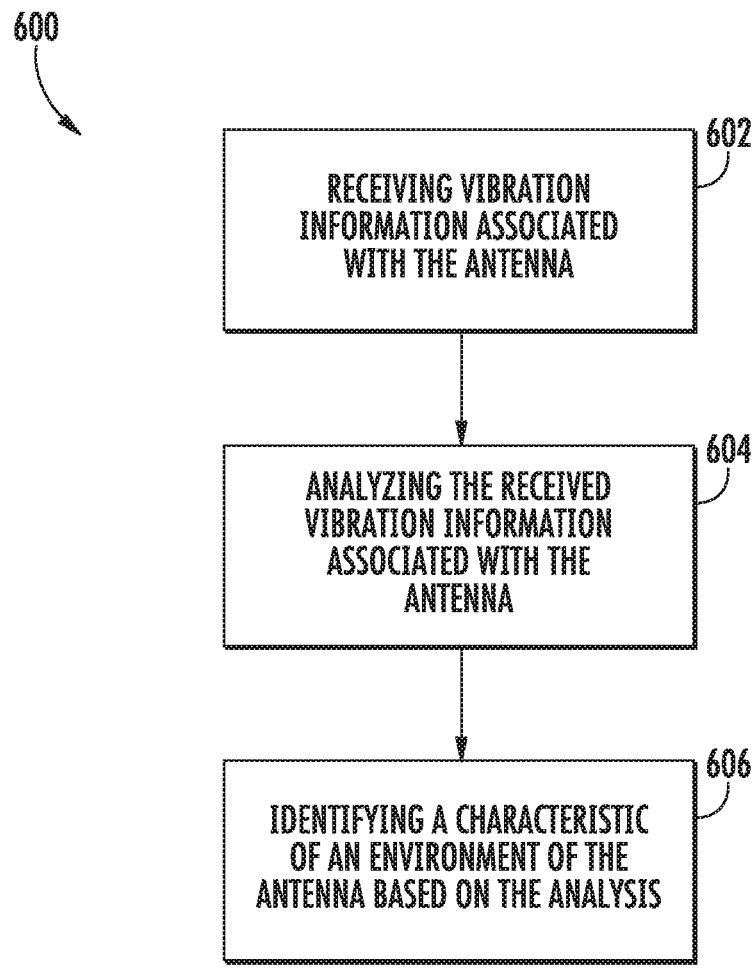
FIG. 6 is a flow chart illustrating a method for determining characteristics of an environment of an antenna through detection of vibrational movement of the antenna according to embodiments of the present disclosure.

FIG. 6 is a flow diagram 600 of one aspect of a method for identifying characteristics of an environment of an antenna through detection of vibrational movement of the antenna. The method 600 may comprise a number of steps which may be performed in any suitable order. Step 601 may include receiving vibration information associated with the antenna. Step 603 may include analyzing the received vibration information associated with the antenna. The analysis may include comparing the received vibration information to one or more stored reference vibration samples. Step 605 may include identifying a characteristic of an environment of the antenna, based on the analysis.

Those of skill would further appreciate that the various illustrative components, modules (e.g., the identification module 516), and associated functionality described in connection with the aspects disclosed herein may be implemented as electronic hardware, computer software, or combinations of both. Skilled artisans may implement the described functionality in varying ways for each particular application, but such implementation decisions should not be interpreted as causing a departure from the scope of the present disclosure.

The various functionality described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import. It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Various aspects of the disclosure have now been discussed in detail; however, the disclosure should not be understood as being limited to these embodiments. It should also be appreciated that various modifications, adaptations, and alternative embodiments thereof may be made within the scope and spirit of the present disclosure.

That which is claimed is:

1. A method of determining one or more characteristics of an environment of an antenna through detection of vibrational movement, the method comprising:
   sensing vibrational movement associated with the antenna using one or more sensors;
   analyzing the sensed vibrational movement, the analyzing comprising performing a frequency domain analysis on the sensed vibrational movement; and
   determining the one or more characteristics of the environment of the antenna based at least in part on the sensed vibrational movement and at least in part on the analysis of the sensed vibrational movement,
   wherein performing the frequency domain analysis comprises comparing the sensed vibrational movement to a stored reference vibration sample, and
   wherein the one or more characteristics of the environment of the antenna includes whether the antenna is correctly installed.

2. The method of claim 1, wherein the one or more sensors includes an accelerometer.

3. The method of claim 1, wherein the one or more sensors includes a gyroscope.

4. The method of claim 1, wherein the one or more sensors are also configured to detect at least one of azimuth, skew and tilt of the antenna.

5. The method of claim 1, wherein analyzing the sensed vibrational movement comprises performing a time domain analysis on the sensed vibrational movement.

6. The method of claim 1, wherein the comparison includes a comparison of an amplitude of the sensed vibrational movement to an amplitude of the stored reference vibration sample.

7. The method of claim 1, wherein the comparison includes a comparison of a frequency of the sensed vibrational movement to a frequency of the stored reference vibration sample.

8. The method of claim 1, wherein analyzing the sensed vibrational movement comprises determining a direction of the sensed vibrational movement.

9. The method of claim 1, wherein the stored reference vibration sample is associated with one of the one or more characteristics of the environment of the antenna.

10. The method of claim 9, wherein the one of the one or more characteristics of the environment of the antenna is that the antenna is incorrectly installed.

11. The method of claim 4, further comprising using the at least one of the azimuth, skew and tilt of the antenna to detect a direction of the sensed vibrational movement.

12. The method of claim 1, further comprising storing a history of sensed vibrational movements in a memory.

13. The method of claim 1, further comprising determining a wind speed based on the sensed vibrational movement.

* * * * *